US007602513B2

(12) United States Patent
Uwagaki et al.

(10) Patent No.: US 7,602,513 B2
(45) Date of Patent: Oct. 13, 2009

(54) PAPER CONVEYING APPARATUS AND PRINTING APPARATUS

(75) Inventors: Hideo Uwagaki, Kyoto (JP); Ryoichi Kawai, Nara (JP); Shigeo Miyamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1220 days.

(21) Appl. No.: 10/411,129

(22) Filed: Apr. 11, 2003

(65) Prior Publication Data

US 2003/0210315 A1 Nov. 13, 2003

(30) Foreign Application Priority Data

Apr. 12, 2002 (JP) .......................... P2002-111091

(51) Int. Cl.
*G06F 15/00* (2006.01)
*G06K 1/00* (2006.01)

(52) U.S. Cl. ..................... 358/1.15; 358/1.14; 358/496; 358/497; 358/498; 399/124; 399/367; 399/394; 399/361; 271/10.1; 271/10.13; 271/109; 271/264; 271/270

(58) Field of Classification Search ................ 358/1.14, 358/1.15, 29, 496–498; 399/394, 124, 367, 399/361; 347/104; 271/264, 297, 262, 305, 271/242, 10.1, 10.13, 109, 270; 270/58.09, 270/58.1
See application file for complete search history.

(56) References Cited

U.S. PATENT DOCUMENTS 5,974,290 A * 10/1999 Inoue ......................... 399/124
5,982,400 A 11/1999 Yokoi et al.
6,038,424 A * 3/2000 Nakagawa .................. 399/367
6,092,893 A 7/2000 Yokoi et al.
6,142,461 A * 11/2000 Asao et al. ............... 270/58.09
6,257,692 B1 7/2001 Yokoi et al.
6,325,371 B1 * 12/2001 Araki et al. ................. 271/297
6,438,351 B2 * 8/2002 Kawachi et al. ............. 399/394
6,568,668 B1 * 5/2003 Wakabayashi et al. ... 270/58.11
6,601,843 B2 * 8/2003 Miki ....................... 271/10.13
6,648,319 B2 * 11/2003 Chapman ..................... 270/45
6,705,609 B2 * 3/2004 Kim ........................... 271/262
6,708,972 B2 * 3/2004 Ogita et al. ................. 271/305

(Continued)

FOREIGN PATENT DOCUMENTS

EP 1342582 A2 9/2003

(Continued)

*Primary Examiner*—Edward L Coles
*Assistant Examiner*—Satwant K Singh
(74) *Attorney, Agent, or Firm*—Birch, Stewart, Kolasch & Birch, LLP

(57) ABSTRACT

A paper conveying apparatus, having a simple structure, in which variation in a load imposed on paper is reduced to suppress printing irregularities, and also a printer are provided. A pair of rollers of a second conveying apparatus, arranged at a predetermined interval away from a first conveying apparatus, are composed of a rotationally-driven driving roller and a driven roller which is trailingly rotated, with paper being gripped between the driving roller and the driven roller. The pairs of rollers of the second conveying apparatus are arranged in different positions along the paper conveying direction. The paper gripping pressure of the pair of driving rollers arranged on the upstream side along the paper conveying direction is set to be lower than that of the other pairs of driving rollers.

14 Claims, 3 Drawing Sheets

U.S. PATENT DOCUMENTS 6,799,620 B2 * 10/2004 Takekoshi .................. 156/384
6,799,761 B2 * 10/2004 Kato .......................... 271/242

FOREIGN PATENT DOCUMENTS

JP 5-69610 A 3/1993
JP 8-208094 A 8/1996
JP 10-114442 A 5/1998
JP 10-297039 A 11/1998
TW 346119 B 11/1998
TW 352724 B 2/1999

* cited by examiner

PAPER CONVEYING APPARATUS AND PRINTING APPARATUS

BACKGROUND OF THE INVENTION

1. Field of the Invention

The present invention relates to various types of printers, paper conveying apparatuses which are provided in image reading apparatuses and the like, printing apparatuses using the same, more particularly, to paper conveying apparatuses and printing apparatuses capable of conveying paper without troublesome problems.

2. Description of the Related Art

In a paper conveying apparatus which is provided in printers of various types, etc., it is necessary to prevent occurrence of printing irregularities resulting from variation in the conveyance status of paper. In order to achieve and maintain satisfactory paper conveyance (sub-scanning operation) over the entire recording region, a variety of constructions have been proposed to date.

Taken up as one example is a recording apparatus disclosed in Japanese Unexamined Patent Publication JP-A 5-69610 (1993). In this recording apparatus, to eliminate adverse effects of backlash occurring in the driving system for conveying recording paper and to enable to achieve a satisfactory sub-scanning operation over the entire recording region, a first conveying roller and a second conveying roller are arranged on upstream and downstream sides of a recording position along a direction in which paper is conveyed (paper conveying direction). The first and second conveying rollers are driven by a single, common motor. The second conveying roller is set to be greater in conveying speed than the first conveying roller. The first conveying roller is so designed as to convey paper at a lower than normal speed over a certain period of time during a tail end of recording paper passes through the first conveying roller.

Taken up as another example is an ink-jet recording apparatus disclosed in Japanese Unexamined Patent Publication JP-A 8-208094 (1996). This ink-jet recording apparatus is simple in structure and requires low manufacturing cost. In this construction, recording paper under discharge is kept from contact with a recording face of already discharged paper by curling the middle part of the paper under discharge. After the completion of the discharge, the paper is superimposed upon the already discharged paper under its own weight. In order to prevent occurrence of a smear resulting from a rub against the recording surface, a plurality of spurs, which are brought into press-contact with a paper discharge roller, are arranged in such a way that the ones located closer to both ends are selectively positioned forward along a paper feeding direction, or the spurs are arranged only at end portions in the direction of paper width, and in the vicinity of the paper discharge roller is disposed a paper guide for lifting a central portion in the direction of paper width of the recording paper. Thereby, the central portion in the direction of paper width of the recording paper is kept in a suspended state during the discharge.

Taken up as still another example is a recording apparatus disclosed in Japanese Unexamined Patent Publication JP-A 10-297039 (1998), which is devised with the aim of providing a recording apparatus incorporating paper discharge means in which spurs can be disposed at high density without additionally providing a paper discharge roller shaft. In this construction, spurs are located face to face with a paper discharge roller in a direction such as to sandwich a material to be recorded, and the spurs are alternately disposed at two different parallel shaft positions, thereby constituting a first spur group and a second spur group. An interval L2 between the adjacent spurs of the first and second spur groups is set to be shorter than a length L1 of an elastic shaft of the spur.

In the ink-jet recording apparatus, its paper conveying apparatus is generally constructed as follows. On upstream and downstream sides of a printing section for performing printing are arranged first conveying means and second conveying means, respectively. Paper is fed to the printing section by the first conveying means, and, after undergoing printing, the paper is conveyed along a paper discharge direction by the second conveying means. In this construction, however, undesirable printing irregularities occur frequently. Details are given below.

That is, at the time when the just-printed paper reaches the second conveying means, a leading end of the paper abuts against the second conveying means. At the instant when the paper is get caught in the roller, resistance is increased, and the paper is abruptly put under heavy load. Resultantly, the paper is subjected to a force in a direction in which its movement comes to halt. This causes variation in the amount of paper conveyance, resulting in printing irregularities. Such a detrimental effect attributed to variation in the amount of paper conveyance may appear not only in the ink-jet recording apparatus but also in other like apparatuses. For example, in an image reading apparatus, as a result of variation in the amount of paper conveyance, the paper conveying direction is disturbed, resulting in an readout image being misregistered.

However, the aforementioned constructions each have drawbacks. Firstly, in the recording apparatus disclosed in JP-A 5-69610, the second conveying means, disposed on the downstream side of the printing head, is composed of the second conveying roller and a second driven roller. The second driven roller is simply retained by a second holding member and is kept press-contact with the second conveying roller by a second spring. That is, this construction pays no regard to measures for reducing variation in a load imposed on paper. Thus, there is a possibility that printing irregularities occur due to the variation of the paper conveying direction as described above.

Secondly, in the ink-jet recording apparatus disclosed in JP-A 8-208094, a plurality of spurs, which are brought into press-contact with the paper discharge roller, are arranged in such a way that the ones located closer to both ends are selectively positioned forward along the paper feeding direction, or the spurs are arranged only at the end portions in the direction of paper width, and in the vicinity of the paper discharge roller is disposed the paper guide for lifting the widthwise central portion of the recording paper. In this case, a plurality of spurs are arranged in different positions solely for the purpose of subjecting paper to curling. That is, this construction pays no regard to measures for adjusting a load imposed on paper.

Thirdly, in the recording apparatus disclosed in JP-A 10-297039, a plurality of spurs are alternately disposed at two different parallel shaft positions for the purpose of preventing a rippling phenomenon (so-called cockling) that appears in a direction perpendicular to the paper conveying direction. This allows the spurs to be disposed at high density without additionally providing a paper discharge roller shaft. In this case, however, a larger number of constituent components are required, resulting in the manufacturing cost being increased.

This construction also pays no regard to measures for adjusting variation in a load imposed on paper.

SUMMARY OF THE INVENTION

The invention has been devised in view of the above-described problems with the conventional art, and accordingly its object is to provide a simple-structure paper conveying apparatus in which variation in a load imposed on paper is reduced to suppress printing irregularities.

The structural features of the invention that are devised to solve the above stated problems will be set forth hereunder.

The invention provides a paper conveying apparatus for conveying paper, comprising:

first conveying means including a plurality of paired driving rollers, the paired driving rollers being arranged in a direction perpendicular to a paper conveying direction; and second conveying means including a plurality of paired driving rollers, the paired driving rollers being arranged at predetermined intervals away from the first conveying means, wherein the pairs of driving rollers constituting the second conveying means each include a driving roller which is rotationally driven and a driven roller which is trailingly rotated with paper being gripped between the driving and driven rollers, wherein the pairs of driving rollers of the second conveying means are arranged in a plurality of different positions along the paper conveying direction, and wherein a paper gripping pressure of the pair of driving rollers arranged on an upstream side along the paper conveying direction is set to be lower than those of the other pairs of driving rollers.

In the invention, it is preferable that, in the second conveying means, the driven roller of the pair of driving rollers is arranged in a plurality of different positions along the paper conveying direction.

According to the invention, the pairs of driving rollers of the second conveying means are arranged in a plurality of different positions along the paper conveying direction. This makes it possible to reduce the effects of variation in a load imposed on paper. Moreover, in the second conveying means, the pair of driving rollers arranged on the upstream side along the paper conveying direction is set to be lower in paper gripping pressure than the other pairs of driving rollers. Thus, when a leading end of paper abuts against the driving rollers first, the resultant load incurred on the paper can be minimized. As a result, the paper conveying direction is less prone to being disturbed and the paper is accordingly conveyed in a proper manner at all times, and thereby printing irregularities can be suppressed successfully.

With the invention, the apparatus can be realized in a simple manner without adding extra members, thereby reducing the manufacturing cost.

In the invention, it is preferable that, in the second conveying means, the pair of driving rollers located on the upstream side along the paper conveying direction is disposed at a central position in a direction of paper width.

In the invention, it is preferable that, in the second conveying means, the pair of driving rollers including the driven roller which is located on the most upstream side along the paper conveying direction is disposed at the central position, in the paper width direction.

According to the invention, in the second conveying means, the pair of driving rollers located on the upstream side along the paper conveying direction is disposed at the central position in the direction of paper width. Thus, when the leading end of paper abuts against the pair of driving rollers first, the resultant load incurred on the paper can be minimized. Moreover, since the load acts upon the center of the leading end of the paper, the paper conveying direction is less prone to being disturbed.

In the invention, it is preferable that, in the second conveying means, the pair of driving rollers arranged on the outermost side is disposed on the upstream side along the paper conveying direction, next to the pair of driving rollers disposed at the central position in the paper width direction.

In the invention, it is preferable that, in the second conveying means, the driven roller of the pair of driving rollers arranged on the outermost side is disposed on the upstream side along the paper conveying direction, next to the driven roller of the pair of driving rollers disposed at the central position in the paper width direction.

According to the invention, in the second conveying means, the pair of driving rollers arranged on the outermost side is disposed on the upstream side next to the pair of driving rollers disposed at the central position in the paper width direction. With this arrangement, paper is, after being gripped at the center of its leading end, gripped at its opposite ends by the pair of driving rollers arranged on the outermost side. Resultantly, the paper can be moved smoothly and a gap between the head nozzle surface and the printing surface of the paper can be kept uniform, and thereby high printing quality can be maintained with stability.

In the invention, it is preferable that, in the second conveying means, the paper gripping pressure of the pair of driving rollers disposed at the central position in the paper width direction is set at the lowest level, and the paper gripping pressure of the pair of driving rollers disposed on the outermost side is set at the next lowest level after the pair of driving rollers disposed at the central position.

According to the invention, in the second conveying means, the paper gripping pressure of the pair of driving rollers disposed on the outermost side is set at the next lowest level after the pair of driving rollers disposed at the central position. With this setting, paper is, after being gripped at the center of its leading end, gripped at its opposite ends by the pair of driving rollers arranged on the outermost side, under the next lowest paper gripping pressure after the pair of driving rollers arranged at the central position. Resultantly, the paper can be prevented from being moved unevenly, and thereby high printing quality can be maintained with stability.

In the invention, it is preferable that, in the second conveying means, the paper gripping pressure exerted by the paired driving rollers is set at least in three levels or more in such a way that, the more the pair of driving rollers is arranged closer to the downstream side along the paper conveying direction, the higher its paper gripping pressure can be.

According to the invention, the paper gripping pressure is set at least in three levels or more in such a way that, the more the pair of driving rollers is arranged closer to the downstream side along the paper conveying direction, the higher its paper gripping pressure can be. With this setting, the paper gripping pressure is gradually increased in the course of paper conveyance, and thereby uneven movement of paper can be prevented. Moreover, since the paper can be conveyed from the second conveying means under a sufficient gripping pressure, proper paper conveyance can be ensured.

In the invention, it is preferable that, in the second conveying means, the driven roller of the pair of driving rollers is formed as a star-shaped spur.

According to the invention, since the driven roller is formed as a star-shaped spur, transfer of ink from printed paper can be minimized. Thus, degradation of the printing quality resulting from re-transfer of ink can be prevented.

In the invention, it is preferable that the second conveying means is set to be slightly higher in paper conveying speed than the first conveying means.

According to the invention, since the second conveying means is set to be slightly higher in paper conveying speed than the first conveying means, it is possible to impart a tension to paper and thus prevent occurrence of wrinkles and slack in the paper. Thereby, the printing quality can be enhanced with stability.

The invention further provides a printing apparatus in which a printing head of ink-jet type is disposed between the first and second conveying means of the paper conveying apparatus described above.

According to the invention, the printing apparatus is provided with a paper conveying apparatus which is simple in structure and allows paper to be conveyed in proper conditions at all times. Thus, the printing apparatus can offer high printing quality and nevertheless can be manufactured at low cost.

BRIEF DESCRIPTION OF THE DRAWINGS

Other and further objects, features, and advantages of the invention will be more explicit from the following detailed description taken with reference to the drawings wherein.

DETAILED DESCRIPTION OF THE INVENTION

Figure 1:
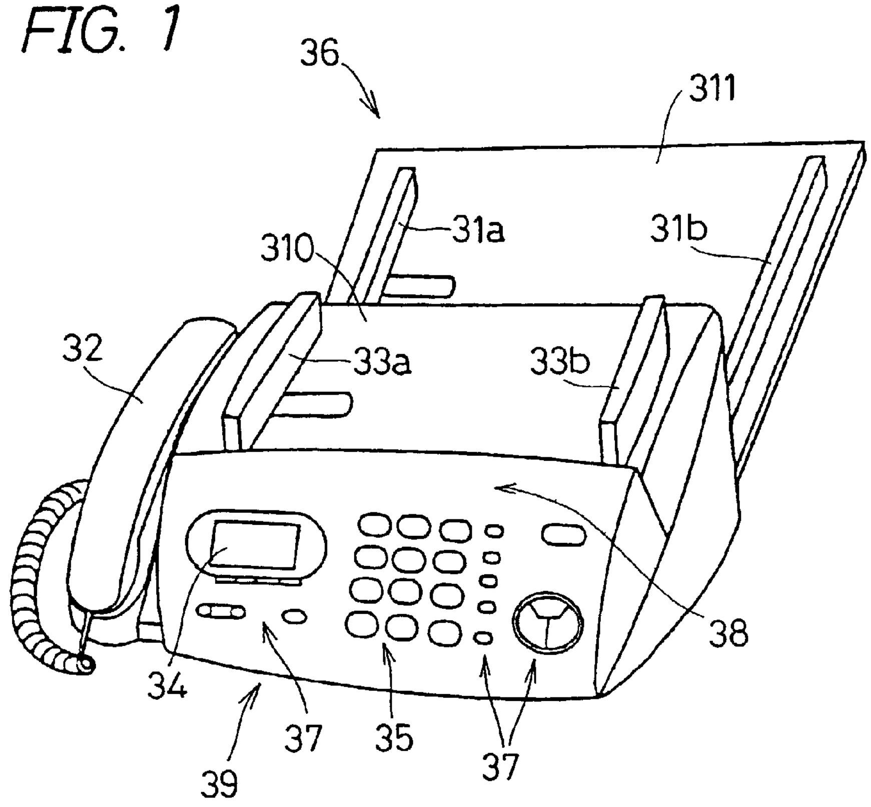
FIG. 1 is a perspective view showing a facsimile apparatus to which the paper conveying apparatus is applied, which is an embodiment of the invention.

Now referring to the drawings, embodiments of the invention are described below.

Hereinafter, a detailed description will be given as to a paper conveying apparatus and a printing apparatus according to an embodiment of the invention, with reference to the accompanying drawings.

FIG. 1 is a perspective view showing a facsimile apparatus defined as the printing apparatus. In this facsimile apparatus, an operation panel section 38, into which machine-interface functions are integrated, is disposed on an upper part of a front of a facsimile main body 36, i.e., the most accessible area to users. Included in the operation panel section 38 are a display unit 34 for providing information and guidance to users; a dial key portion 35 by which users give instructions to the facsimile apparatus and enter dial numbers; and an operation key portion 37.

The operation panel section 38 is openably and closably constructed so as for users to handle improper paper feeding in the event of jamming or double feeding of an original, and to perform cleaning on the reading portion. Moreover, a handset 32 is placed on the left-hand side of the facsimile main body 36. The handset 32, which incorporates a transmitter and a receiver for telephone conversation, is used when voice communication is carried out by means of the facsimile apparatus.

Arranged on the upper part of the facsimile main body 36 is an original hopper 310 for loading therein an original which is read out to perform transmission or copying. The original hopper 310 is capable of accommodating a plurality of originals. Although not shown in the figure, a plurality of originals are separated one by one below a rear part of the operation panel section 38, are then read out one after another, and are discharged from an original/paper discharge outlet 39 arranged on a front side.

The original hopper 310 includes original guides 33*a* and 33*b* for preventing an original from being skewed. In this embodiment, an original is aligned on a single side. More specifically, one original guide 33*a* arbitrarily moves to the original hopper 310 in a direction perpendicular to an original conveying direction. The other original guide 33*b* is fixed on the original hopper 310. Understandably, an original can be center-aligned by moving both of the original guides 33*a* and 33*b* to the original hopper 310. The original hopper 310 is also openably and closably constructed. Thus, even if the paper located therebelow is subjected to double feeding, skewing, or other troubles, the resultant paper jamming in the paper conveying section can be handled properly. Moreover, maintenance of the printing portion, for example replacement of ink in the ink-jet system, can be carried out with ease.

A paper hopper 311 accommodates a plurality of paper sheets (recording sheets) used for printing of received or readout images. The plurality of recording sheets are separated one by one by a separating portion (not shown), and then fed to the printing portion. After undergoing image printing in the printing portion, the recording sheets are discharged from the original/paper discharge outlet 39 arranged below the front side. Moreover, although not shown in the figure, it is possible to arrange a stacker on the front side for stacking the discharged originals and sheets collectively or independently.

The paper hopper 311 includes a pair of right-hand and left-hand paper guides 31*a* and 31*b* to prevent paper from being skewed. According to the embodiment of the invention, the papers are aligned on a single side. More specifically, one paper guide 31*a* arbitrarily moves to the paper hopper 311 in a direction perpendicular to the paper conveying direction. The other paper guide 31*b* is fixed on the paper hopper 311. Besides, the paired paper guides 31*a* and 31*b* can be concurrently moved to allow paper to be center-aligned. The paper being guided by both of the paper guides 31*a* and 31*b* is fed, through the paper conveying apparatus mounted in the facsimile apparatus, to an ink-jet head 114 (see FIG. 2), is then subjected to printing, and is discharged out of the facsimile apparatus to be given to users.

Figure 2:
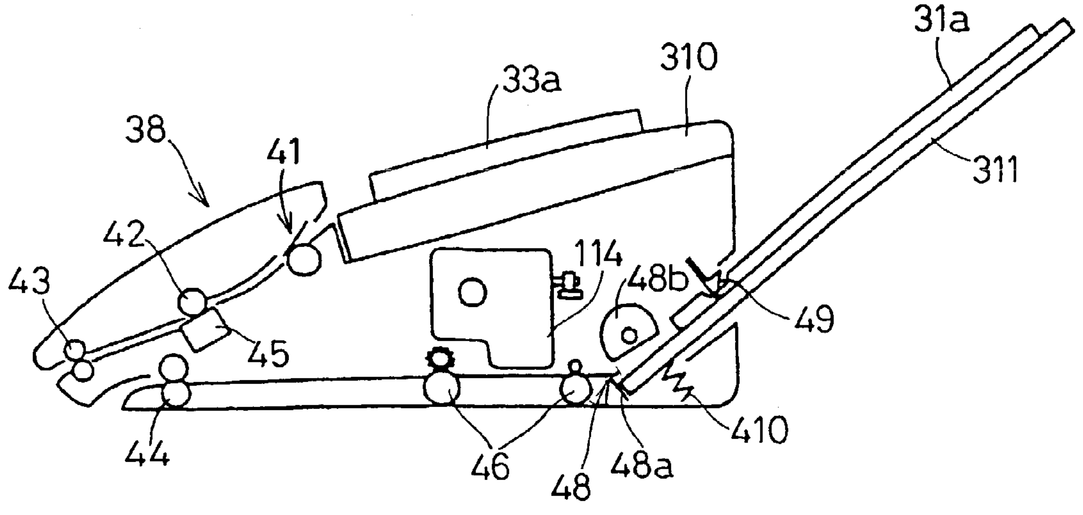
FIG. 2 is a sectional view showing the facsimile apparatus.

FIG. 2 is a schematic sectional view of the facsimile apparatus, illustrating mainly its paper feeding section. In the figure, the components considered to be irrelevant of the invention, in particular the electronic circuit portion, etc. are all omitted. At first, originals to be read out are plurally stacked on top of one another in the original hopper 310. The stack of originals are separated one by one by an original separating section 41 including a roller and a blocking rubber, with their opposite edges being restrained by the paper guides 33*a* and 33*b* to prevent skewing. The originals thus separated then pass through a region between a fixing sensor 45 and a platen roller 42. At this time, the image is read out by the fixing sensor 45. The originals thus read out are discharged to the outside by an original discharge roller 43.

On the other hand, paper sheets are stacked in the paper hopper 311. The sheet is restrained, at its opposite edges, by the paper guides 31*a* and 31*b*. The paper hopper 311, serving for accommodating paper, is commonly provided with a paper sensor 49 for detecting paper and a plurality of paper sensors (not shown) for detecting paper size.

A stack of paper is pressed upward a semicircular roller 48*b* which will be given later, at its leading end, by a paper raising spring 410. A stack of papers is separated one by one by a paper separating section 48 including a separating claw **48*a* for pushing opposite edges of paper in the width direction and the semicircular roller 48*b* and then fed to the printing portion by paper feeding rollers 46. In the printing portion, in the case of adopting the ink-jet system for example, the paper conveyed therein is subjected to spraying of ink by the ink-jet head 114, thereby achieving printing. The ink-jet head 114 is guided by a shaft in such a way as to move in a main scanning direction, namely, a direction perpendicular to a paper face of FIG. 2**. Thereby, printing is performed on the specified region of the paper in cooperation with moving in the paper conveying direction of paper, that is, a sub-scanning direction.

The paper having undergone printing is conveyed toward the outside by the paper feeding rollers 46, and is then discharged by a paper discharge roller 44. The two groups of paper feeding rollers 46, for having sandwiched therebetween the ink-jet head 114, function as the paper conveying apparatus according to the invention. Specifically, the right-hand pair of rollers, viewing FIG. 2, corresponds to a first conveying apparatus (first conveying means) 11, whereas the left-hand pair of rollers in FIG. 2 corresponds to a second conveying apparatus (second conveying means) 12 (refer to FIG. 3). More details thereof will be given later.

Figure 3:
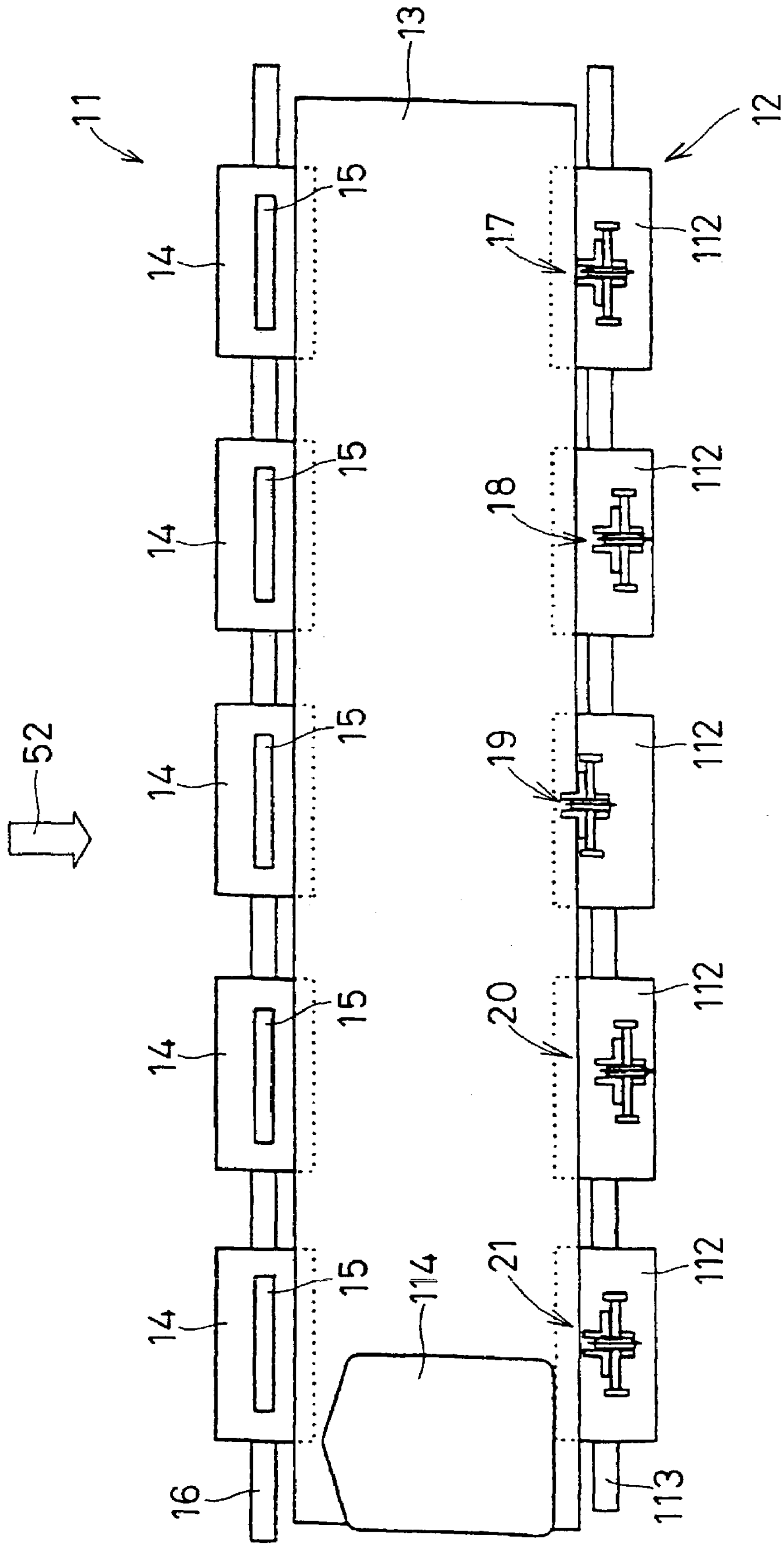
FIG. 3 is a plan view showing a paper conveying apparatus according to an embodiment of the invention.
Figure 4:
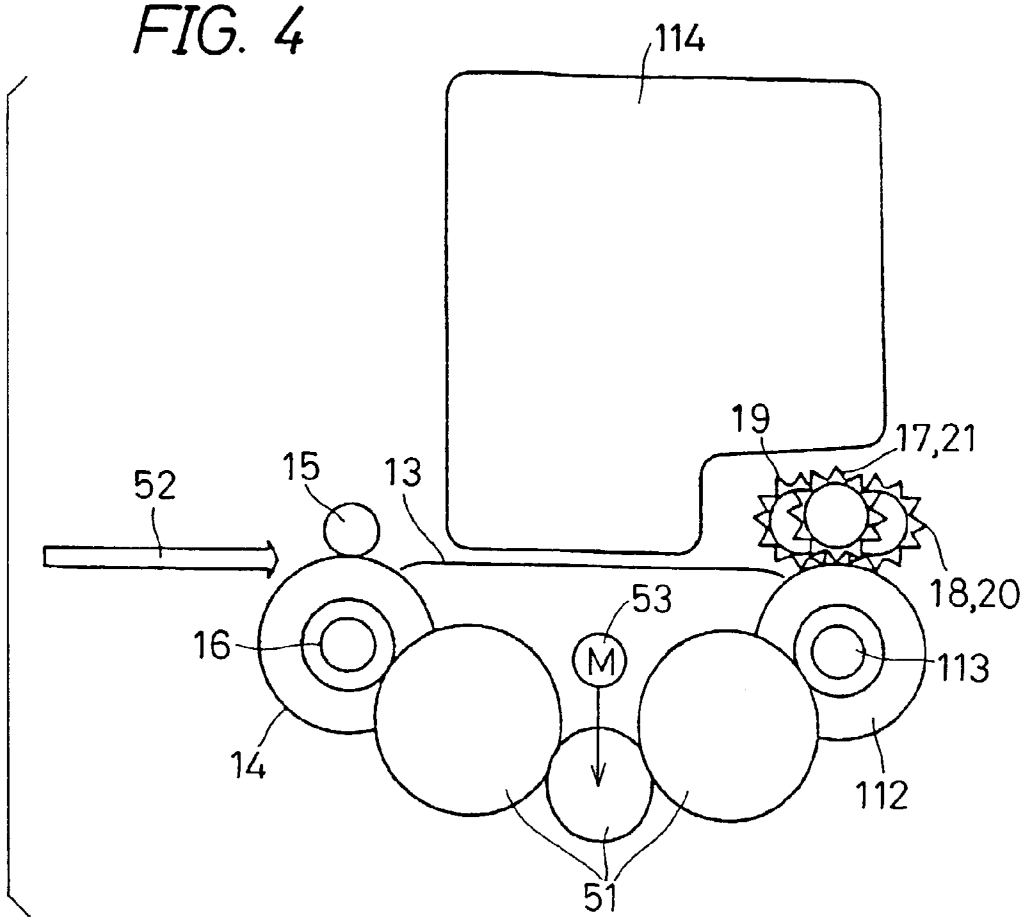
FIG. 4 is a sectional view showing the printing section of the facsimile apparatus.

FIG. 3 is a plan view of the paper conveying apparatus and FIG. 4 is a cross sectional view of the printing portion. The ink-jet head 114 is moved in the main scanning direction, namely, from side to side in FIG. 3, while moved perpendicularly to the paper face of the figure in FIG. 4, so as to emit ink toward a paper feeding guide 13 having paper stacked thereon, thereby performing printing. In the figures, a shaft for supporting the ink-jet head 114, a holding portion, a mini pitch belt for moving the ink-jet head 114, a flat cable for transmitting a signal to the head portion, etc. are omitted. Also omitted from the figures are portions for supporting the first and second conveying apparatuses 11 and 12, and, for that matter, means for supporting a first driven roller 15 and second driven rollers 17, 18, 19, 20, and 21. In each of FIGS. 3 and 4, reference numeral 52 represents the paper conveying direction, namely, the sub-scanning direction.

The first conveying apparatus 11 is composed of a plurality of first driving rollers 14, a plurality of first driven rollers 15, a first roller driving shaft 16, etc., for feeding paper to the printing portion along the paper feeding guide 13. The first driving roller 14 is coaxially disposed on the first roller driving shaft 16 at intervals away from each other in an axial direction of the first roller driving shaft 16. The second conveying apparatus 12 is composed of a plurality of second driving rollers 112, a plurality of second driven rollers 17, 18, 19, 20, and 21, a second roller driving shaft 113, etc., for gripping paper fed from the printing portion and for discharging the paper out of the apparatus or feeding it to the next paper discharge portion. The second driving roller 112 is coaxially disposed on the second roller driving shaft 113 at intervals away from each other in the axial direction of the second roller driving shaft 113. In the first conveying apparatus 11, the first driving roller 14 and the first driven roller 15 constitute the pair of driving rollers according to the invention. In the second conveying apparatus 12, the second driving roller (driving roller) 112 and the second driven rollers (driven rollers) 17, 18, 19, 20, and 21 constitute the pair of driving rollers according to the invention. The first and second roller driving shafts 16 and 113 extend in a direction perpendicular to the paper conveying direction 52, namely, in the main scanning direction and are arranged at a specified interval in the paper conveying direction 52, namely the sub-scanning direction.

The first and second driving rollers 14 and 112 are subjected to power transmission from a single, common driving source 53 via a driving force transmitting gear group 51. In this embodiment, the paper feeding speed of the second conveying apparatus 12 is set to be a few percent, for example, approximately 1%, higher than that of the first conveying apparatus 11 (the number of revolutions of the second conveying apparatus 12 is set to be a few percent, for example, approximately 1%, larger than that of the first conveying apparatus 11). This helps prevent occurrence of wrinkles and slack in the paper.

The second driven rollers 17 to 21, of which each is rotated in the wake of the second driving roller 112, are each constituted by a star-shaped spur roller and serve to prevent transfer of ink deposited onto paper. This helps prevent deterioration of the printing quality caused by retransfer of ink onto paper. Note that the paper conveying apparatus embodying the invention is not limited to the ink-jet system, and accordingly no particular limitation is imposed on the configuration of the driven roller 17 to 21.

The paper fed from the first conveying apparatus 11 is, after undergoing printing, changed in its conveying direction at the instant when gripped by the second conveying apparatus 12 due to variation in the load imposed on the paper. This results in printing irregularities. To prevent this, in this embodiment, particularly the second driven rollers 17 to 21 of the second conveying apparatus 12 are arranged in different positions along the sub-scanning direction, namely, the paper conveying direction, so that the paper is inhibited from abutting against all of the second driven rollers 17 to 21 at one time. Specifically, the second driven rollers 17 to 21 are respectively arranged at intervals in a range of 1 to 2 mm along the sub-scanning direction.

In particular, in order for paper to be get caught in the roller, at its central part, at first, for preventing skewing, the middle second driven roller 19 is arranged on the most upstream side along the paper conveying direction so as to abut against the paper first and foremost. Moreover, the middle second driven roller 19 is set to be smaller in gripping pressure than the other second driven rollers 17, 18, 20, and 21, so as to reduce variation in the load imposed on the paper to a minimum. This makes it possible to significantly reduce variation in the paper conveying direction and thereby maintain the proper conveyance status. As a result, printing irregularities can be suppressed.

Figure 5:
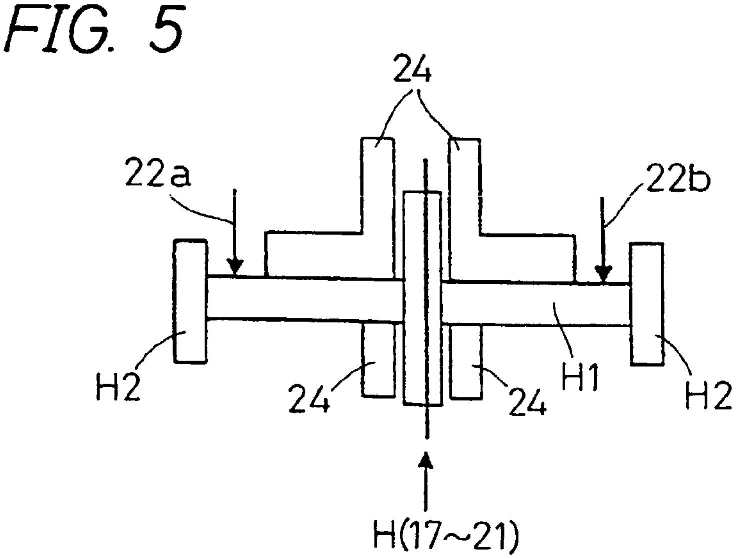
FIG. 5 is an enlarged view showing a driven roller employed in the paper conveying apparatus.

FIG. 5 is an enlarged view of the spur roller portion depicted in FIG. 3. The spur roller H (17 to 21) is a star-shaped spur having a saw-shaped projection formed around it, as shown in FIG. 4. As described above, the contact area between the spur roller and paper is kept narrow. The spur roller H is gripped, at its opposite ends, by roller guides 24 in such a way as to be held substantially perpendicularly to paper at all times and inhibited from tilting.

A rotary shaft H1 of the spur roller H is loaded with an urging force by roller pressing springs **22*a* and 22*b*. The roller pressing springs 22*a* and 22*b* is retained by a spring retainer H2 in a direction such as to push the spur roller H against paper. With the resultant urging force, a paper gripping pressure is generated with respect to the second driving roller 112. By controlling the spring pressure exerted by the roller pressing springs 22*a* and 22*b*, the paper gripping pressure generated between each of the second driven rollers 17 to 21 and the opposed second driving roller 112** can be set arbitrarily. In the embodiment of the invention, the urging force is set to approximately 10 gf, i.e., 0.098 N.

Referring back to FIGS. 3 and 4, the outermost second driven rollers 17 and 21 are disposed on the ink-jet head 114 side, namely, on the upstream side along the paper conveying direction, next to the middle second driven roller 19. With this arrangement, paper can be moved smoothly at all times, and a gap between the head nozzle surface and the printing surface of the paper can be kept uniform. Further, each of the paired second driven rollers 17 and 21 is so adjusted that its paper gripping pressure is kept at the next lowest level after the middle second driven roller 19. This makes it possible to prevent uneven movement of paper and thus ensure satisfactory printing quality with stability.

In this embodiment, five pieces of the second driven rollers 17 to 21 are arranged at different positions, in three levels, along the sub-scanning direction. Alternatively, it is also possible to employ a larger number of paired rollers or to increase the number of arrangement level. In this case, the setting is preferably made such that, the more the roller is arranged closer to the downstream side along the paper conveying direction, the greater its paper gripping pressure can be. This makes it possible to prevent uneven movement of paper and to grip the paper fed from the second conveying apparatus with an adequate force, and thereby the paper can be discharged out of the apparatus or fed to the next paper discharge portion without fail.

Moreover, in this embodiment, the interval between the adjacent pairs of rollers is kept substantially identical. However, for example, in a printing apparatus capable of dealing with paper of varying sizes, ranging from a postal card to B4-sized paper, the postal card also needs to be conveyed in a proper manner. This requires the interval between the pairs of rollers be selectively determined in accordance with the size of paper. Therefore, the pairs of rollers do not necessarily have to be spaced uniformly, and may be arranged at any given intervals in consideration of usage conditions, uses, machine models, or other factors.

Further, it is to be understood that the application of the paper conveying apparatus embodying the invention is not limited to the facsimile apparatus shown in the embodiment described heretofore. The paper conveying apparatus can understandably be applied to the other printers of various types, multifunctional machines, image forming apparatuses, etc., as required, by making design modifications and improvement within the spirit and scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A paper conveying apparatus for conveying paper, comprising:

first conveying means including a plurality of paired first driving rollers, the paired first driving rollers being arranged in a direction perpendicular to a paper conveying direction, the first conveying means being located at an upstream portion of a paper conveying path; and second conveying means including a plurality of paired second driving rollers, the paired second driving rollers being arranged at predetermined intervals away from the first conveying means, the second conveying means being located at a downstream portion of the paper conveying path with respect to the first conveying means, such that the plurality of paired second driving rollers grips the paper simultaneously with the plurality of paired first driving rollers with a time delay, and a predetermined tension is applied to the paper travelling along the paper conveying path by the first conveying means and the second conveying means, wherein each of the plurality of paired second driving rollers includes a driving roller which is rotationally driven and a driven roller which is trailingly rotated with paper being gripped between the driving and driven rollers, wherein a driven roller of one of the plurality of paired second driving roller is arranged on an upstream side along the paper conveying path as compared to a driven roller of another one of the plurality of paired second driving roller, such that the driven roller of said another of the plurality of paired second driving roller grips the paper simultaneously with the driven roller of said one of the plurality of paired driving roller with a time delay, and wherein a paper gripping pressure of said one of the plurality of paired second driving rollers is set to be lower than a paper gripping pressure of said another of the plurality of paired second driving roller.

2. The paper conveying apparatus of claim 1, wherein, in the second conveying means, the paired second driving rollers located on the upstream side along the paper conveying direction is disposed at a central position in a direction of paper width.

3. The paper conveying apparatus of claim 1, wherein, in the second conveying means, the paired second driving rollers arranged on the outermost side is disposed on the upstream side along the paper conveying direction, next to the paired second driving rollers disposed at the central position in the paper width direction.

4. The paper conveying apparatus of claim 1, wherein, in the second conveying means, the paper gripping pressure of the paired second driving rollers disposed at the central position in the paper width direction is set at the lowest level, and the paper gripping pressure of the paired second driving rollers disposed on the outermost side is set at the next lowest level after the paired second driving rollers disposed at the central position.

5. The paper conveying apparatus of claim 1, wherein, in the second conveying means, the paper gripping pressure exerted by the paired second driving rollers is set at least in three levels or more in such a way that, the more the paired second driving rollers is arranged closer to the downstream side along the paper conveying direction, the higher its paper gripping pressure can be.

6. The paper conveying apparatus of claim 1, wherein, in the second conveying means, the driven roller of the paired second driving rollers is formed as a star-shaped spur.

7. The paper conveying apparatus of claim 1, wherein the second conveying means is set to be slightly higher in paper conveying speed than the first conveying means.

8. The paper conveying apparatus of claim 1, wherein, in the second conveying means, the driven roller of the paired second driving rollers is arranged in a plurality of different positions along the paper conveying direction.

9. The paper conveying apparatus of claim 1, wherein, in the second conveying means, the paired second driving rollers including the driven roller which is located on the most upstream side along the paper conveying direction is disposed at the central position in the paper width direction.

10. The paper conveying apparatus of claim 1, wherein, in the second conveying means, the driven roller of the paired second driving rollers arranged on the outermost side is disposed on the upstream side along the paper conveying direction, next to the driven roller of the paired second driving rollers disposed at the central position in the paper width direction.

11. A printing apparatus in which a printing head of inkjet type is disposed between the first and second conveying means of the paper conveying apparatus according to claim 1.

12. The paper conveying apparatus of claim 1, wherein an ink-jet head is disposed between the plurality of paired first driving rollers and the plurality of paired second driving rollers.

13. A paper conveying apparatus, comprising:

a plurality of paired driving rollers arranged in a main scanning direction perpendicular to a sub-scanning direction, at least one of the plurality of paired driving rollers being arranged on an upstream side along the sub-scanning direction with respect to another of the plurality of paired driving rollers, wherein each of the plurality of paired driving rollers includes a driving roller which is rotationally driven and a driven roller which is trailingly rotated with paper being gripped between the driving and driven rollers, and wherein a paper gripping pressure of the at least one of the plurality of paired driving rollers is set to be lower than those of another of the plurality of paired driving rollers.

14. The paper conveying apparatus of claim 13, wherein a driven roller of one of the plurality of paired second driving roller is arranged on an upstream side along the sub-scanning direction as compared to a driven roller of another one of the plurality of paired second driving roller, such that the driven roller of said another of the plurality of paired second driving roller grips the paper simultaneously with the driven roller of said one of the plurality of paired driving roller with a time delay.

* * * * *